United States Patent [19]

Wilt

[11] Patent Number: 4,587,314
[45] Date of Patent: May 6, 1986

[54] CONTINUOUS POLYMERIZATION REACTOR

[75] Inventor: Mason S. Wilt, Bartlesville, Okla.

[73] Assignee: Phillips Petroleum Company, Bartlesville, Okla.

[21] Appl. No.: 586,950

[22] Filed: Mar. 7, 1984

Related U.S. Application Data

[62] Division of Ser. No. 285,644, Jul. 21, 1981, Pat. No. 4,438,074.

[51] Int. Cl.$^4$ .............................................. C08F 2/00
[52] U.S. Cl. ....................................... 526/88; 526/65; 526/72; 526/335
[58] Field of Search ............................ 526/72, 65, 88

[56] References Cited

U.S. PATENT DOCUMENTS

| 648,774 | 5/1900 | Munro | 422/225 |
| 2,418,769 | 4/1947 | Hebard | 102/85 |
| 2,813,137 | 11/1957 | Twaddle et al. | 526/173 |
| 2,875,027 | 2/1959 | Dye | 23/285 |
| 2,939,770 | 6/1960 | Schwartzkopff et al. | 23/283 |
| 2,964,511 | 12/1960 | Cottle | 526/61 |
| 2,964,515 | 12/1960 | Rader | 526/65 |
| 3,003,986 | 10/1961 | Long | 260/29.6 |
| 3,004,016 | 10/1961 | Hawkins | 526/88 |
| 3,008,938 | 11/1961 | Irvin | 526/88 |
| 3,254,071 | 5/1966 | Morgan et al. | 526/61 |
| 3,330,818 | 7/1967 | Derby | 526/88 |
| 3,438,952 | 4/1969 | Christensen | 526/88 |
| 3,458,490 | 7/1969 | Irvin et al. | 526/88 |
| 3,595,941 | 7/1971 | Farrar et al. | 526/173 |
| 3,839,435 | 10/1974 | Shigeyasu et al. | 422/225 |
| 3,944,534 | 3/1976 | Sennari et al. | 526/88 |
| 4,014,859 | 3/1977 | Cooper et al. | 526/65 |
| 4,105,842 | 8/1978 | Nicco et al. | 526/65 |
| 4,136,244 | 1/1979 | Massoubre | 526/173 |
| 4,159,307 | 6/1979 | Shigeyasu et al. | 422/231 |
| 4,239,870 | 12/1980 | Smith | 526/59 |
| 4,243,636 | 1/1981 | Shiraki et al. | 422/225 |

FOREIGN PATENT DOCUMENTS 940180 10/1963 United Kingdom .................. 526/88

OTHER PUBLICATIONS

Hicks et al., Fluid Agitation in Polymer Reactors, Chem. Eng. Prog., vol. 71, No. 8, pp. 74–79.

Primary Examiner—Edward J. Smith
Attorney, Agent, or Firm—French and Doescher

[57] ABSTRACT

In a reactor for continuous polymerization in which an olefinic monomer is polymerized by contacting the olefinic monomer under suitable reaction conditions with an initiator, the formation of residue in the reactor is reduced by introducing the olefinic monomer and initiator into opposite sides of a turbulent zone produced by an agitator in the reactor. This improves mixing of the olefinic monomer and the initiator and prevents the initiator from contacting high concentrations of the olefinic monomer which results in reduced residue formation in the reactor.

1 Claim, 3 Drawing Figures

CONTINUOUS POLYMERIZATION REACTOR

This application is a division of application Ser. No. 285,644, filed July 21, 1981, now U.S. Pat. No. 4,438,074.

This invention relates to continuous polymerization. In one aspect this invention relates to a reactor for a continuous polymerization process. In another aspect this invention relates to a method for reducing gel formation in a continuous polymerization process.

Continuous polymerization of olefinic monomers to form polymers is well known. In general, the polymerization process is intiated by contacting the olefinic monomer with a catalyst system, which is generally referred to as an initiator, in a reactor. Monomer and initiator are continuously fed, generally with a solvent or diluent, to the reactor with the polymer produced by the reaction of the monomer and initiator being continuously removed from the reactor.

Continuous polymerization processes provide for more economic production of polymer and more uniform compositions of the polymer than is generally possible with a batch process. However, it is well known that in continuous polymerization processes there is a tendency for gel to build up in the reactor in which the monomer and initiator are contacted which results in fouling of the reactor. As used herein the term gel refers to polymeric residue which is insoluble in the reaction medium and coats the surfaces of the reactor which are in contact with the reaction mixture. In this context, the polymer may be insoluble because of extremely high molecular weight or it may be insoluble because of crosslinking side reactions which form a three-dimensional network in the polymer analogous to the well known vulcanization of rubbery polymers.

It is thus an object of this invention to provide a reactor for contacting monomer and initiator in a continuous polymerization process the design of which results in reduced formation of gel in the reactor. It is another object of this invention to provide a method for reducing gel formation in the reactor in which monomer and initiator are contacted in a continuous polymerization process.

In accordance with the present invention, olefinic monomer and initiator are introduced into opposite sides of at least one turbulent zone produced by at least one agitator in a reactor. This improves mixing of the olefinic monomer and the initiator and prevents the initiator from contacting high concentrations of the olefinic monomer which results in reduced gel formation in the reactor in which the olefinic monomer and initiator are contacted.

Other objects and advantages of the invention will be apparent from the foregoing brief description of the invention and the claims as well as from the detailed description of the process and drawing in which:

The reactor is described in terms of a preferred reactor in which three agitators are utilized. However, the invention is applicable to the use of any number of agitators which may be desired for a particular reactor configuration. The reactor is also described in terms of a particular arrangement of two different types of agitators. However, the invention is applicable to any desired arrangement of agitators and is also applicable to different types of agitators than those illustrated.

Figure 1:
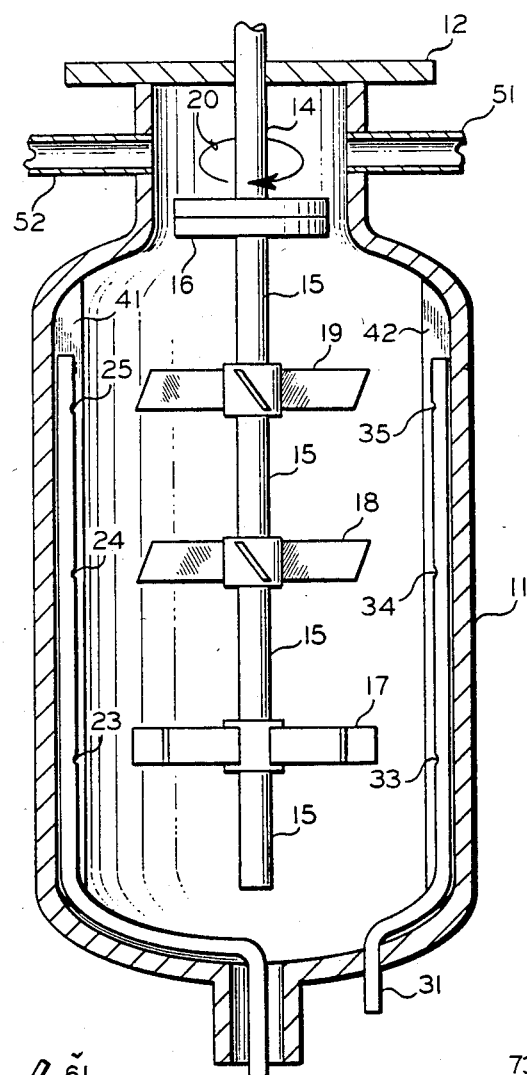
FIG. 1 is a side view of the reactor of the present invention with the outside portion of the reactor being cut away.

Referring now to the drawings and in particular FIG. 1, there is illustrated a vessel 11 which is utilized to confine the olefinic monomer and initiator during the reaction. Any suitable configuration for the vessel 11 may be utilized. Preferably, the vessel 11 consists of a lower portion through which the conduits carrying olefinic monomer and initiator enter and an upper portion from which polymer is removed. The lower and upper portion are separated by a cylindrical portion in such a manner that the longitudinal axis of the cylindrical portion extends through the center of the lower and upper portions. The upper portion of the vessel 11 is sealed by the plate 12. A drive shaft 14 extends through the plate 12. The drive shaft 14 may be coupled to any suitable drive mechanism such as an electric motor. Shaft 15 extends along the longitudinal axis of the vessel 11 to a point closely adjacent the bottom of the vessel 11. The shaft 15 is operably coupled to the drive shaft 14 by the coupling mechanism 16. Three agitators 17, 18 and 19 are coupled to the shaft 15. Preferably, the agitators 17, 18 and 19 are equidistantly spaced with the upper agitator 19 being spaced from the coupling element 16 by the same distance as the upper agitator 19 is spaced from the middle agitator 18. Preferably, the agitator 17 is a radial agitator while the agitators 18 and 19 are axial agitators. As used herein the term radial agitator refers to an agitator the blades of which have no pitch with respect to the shaft 15. In contrast, as used herein the term axial agitator refers to an agitator the blades of which have a pitch with respect to the shaft 15. Preferably, the pitch of the axial agitators 18 and 19 is such that the turbulent zones produced are directed towards the bottom of the vessel 11 to provide improved mixing of the monomer and initiator throughout the reactor which results in increased conversion of monomer to polymer. The agitators 17–19 are rotated continuously in the same direction during the continuous polymerization process. For the reactor of FIG. 1, the direction of rotation is as shown by the arrow 20.

The arrangement of the agitators illustrated in FIG. 1 is preferred because the residence time in the reactor is increased over that which can be obtained with other agitator arrangements. The increased residence time results in higher monomer conversion.

Monomer is introduced into the vessel 11 through conduit means 21 which extends through the bottom portion of the vessel 11 and along one side of the cylindrical portion of the vessel 11 to a point above the top of the agitator 19. The only outlets for monomer from conduit means 21 are outlet holes 23, 24 and 25. Monomer is released from outlet hole 23 into the turbulent zone produced by the agitator 17. In like manner, monomer is released from outlet holes 24 and 25 into the turbulent zones produced by agitators 18 and 19, respectively. Initiator is introduced into the vessel 11 through conduit means 31 which extends through the bottom portion of the vessel 11 and along a second side of the cylindrical portion of the vessel 11, which is substantially diametrically opposed to the first side, to a position above the top of the agitator 19. Again, the only fluid outlets from conduit means 31 are outlet holes 33, 34 and 35. Initiator flows from the outlet hole 33 into the turbulent zone produced by the agitator 17. In like manner, initiator flows from the outlet holes 34 and 35 into the turbulent zones produced by agitators 18 and 19, respectively.

The outlet holes for monomer and initiator may be located in any desired manner with respect to the turbulent zones which will allow introduction of monomer and initiator into each turbulent zone in the reactor. Preferably, the outlet holes for monomer and initiator are located at a point formed by the intersection of a line extending from the bottom of the blade portions of the agitators to the conduits for monomer and initiator. Also, for maximum suppression of gel formation, the outlet holes for monomer are substantially diametrically opposed to the outlet holes for initiator in the vessel 11.

Other techniques could be used to introduce monomer and initiator into the vessel 11 if desired. As an example, separate conduits could enter the cylindrical side portion of the vessel 11 and open directly into the turbulent zones. The important factor is the introduction of monomer by any means into a first part of the periphery of a turbulent zone and the introduction of monomer into a second part of the periphery of the turbulent zone, where the first part of the periphery is substantially diametrically opposed to the second side of the periphery.

To promote mixing of monomer and initiator in the vessel 11, four baffles spaced equidistantly around the circumference of the inside surface of the vessel 11 are preferably utilized. The baffles are preferably located substantially adjacent the sides of the cylindrical portion of the vessel 11. Only two baffles 41 and 42 are illustrated in FIG. 1. One of the remaining baffles is hidden by the shaft 15 and the other baffle has been cut away to illustrate the reactor more fully.

Baffles are not required in the reactor if adequate mixing can be obtained without the baffles. In most continuous polymerization processes at least two baffles will be utilized to promote adequate mixing with four baffles being preferred.

The baffles in the reactor, of which baffles 41 and 42 are representative, may be supported in any desired manner such as a standard baffle support ring (not illustrated). In like manner, the conduits 21 and 31 may be supported inside the reactor by any suitable method. Preferably, the conduits 21 and 31 are supported by the same baffle support rings which support the baffles 41 and 42.

As has been previously stated, monomer and initiator are introduced into the vessel 11 through conduit means 21 and 31, respectively. Also, as is well known in continuous polymerization processes, solvents, randomizers, gel suppressants, couplers, stabilizers and other well known reactants may be introduced with the monomer or initiator. The reaction mixture, of which polymer will form a major portion, is removed from the vessel 11 through conduit means 51 which extends through an upper portion of the vessel 11. The thus removed reaction mixture is processed as required by the specific continuous polymerization process.

Although not required, as a safety measure it is preferred to locate an additional conduit 52 in an upper portion of the vessel 11 with conduit 52 being connected to a safety blowout disc (not illustrated). Pressure gauges may also be associated with conduit means 52 with such pressure measurements being utilized to control the flow of reactants through conduit means 51 in such a manner that a desired pressure is maintained in the vessel 11.

Figure 2:
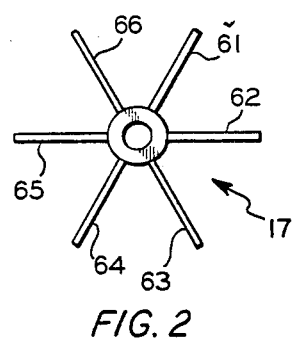
FIG. 2 is a top view of one embodiment for an agitator.

Referring now to FIGURE 2, there is illustrated a top view of the radial agitator 17. As is illustrated in FIG. 2, the radial agitator 17 preferably has six blades 61–66. More or fewer blades may be utilized as desired. The blades 61–66 are preferably rectangular plates although other geometric forms could be used if desired. Two sides of the blades 61–66 preferably extend outwardly from the shaft 15 at substantially 90° angles. The blades 61–66 are aligned so as to be perpendicular to the direction of rotation of the radial agitator 17 and thus a stronger turbulence and mixing effect is provided by the radial agitator 17 than by the axial agitators 18 and 19. The turbulent zone is directed outwardly towards the lower part of the cylindrical portion of the vessel 11.

Figure 3:
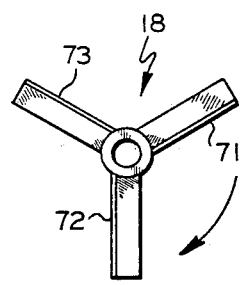
FIG. 3 is a top view of a second embodiment of an agitator.

Referring now to FIG. 3, there is illustrated a top view of the agitators 18 and 19 illustrated in FIG. 1. As is illustrated in FIG. 3, the agitators 18 and 19 preferably have three blades 71–73. The blades 71–73 are preferably rectangular plates although other geometric forms could be used if desired. Two sides of the blades 71–73 preferably extend outwardly from the shaft 15 at substantially 90° angles. The blades 71–73 are aligned so as to have at least about a 15° pitch with respect to the longitudinal axis of the vessel 11 and the shaft 15 with a 45° pitch being preferred. The direction of the pitch is such as to provide a turbulent zone directed towards the lower portion of the vessel 11 at the pitch angle.

As has been previously stated, the reactor illustrated in FIG. 1 is applicable to a large number of continuous polymerization processes in which it is desired to contact monomer and initiator to form polymer. The reactor is particularly applicable to the production of homopolymers or conjugated dienes or random copolymers of conjugated dienes and vinyl aromatic compounds in solution polymerization processes.

Any suitable olefinic monomer may be contacted with any suitable initiator in the vessel 11 under any suitable conditions to produce polymer. Specific olefinic monomers, initiator systems and reaction conditions are well known. As an example, U.S. Pat. No. 3,219,647, which is hereby incorporated by reference, discloses suitable olefinic monomers which may be used in continuous polymerization systems which employ the transition metal/organometal catalyst systems which are generally referred to as the Zeigler-type initiators. The reaction conditions may be the same as those described in U.S. Pat. No. 3,219,647. It is noted that if the initiator system comprises two or more components, the most convenient way for such initiator systems to be utilized with the reactor illustrated in FIG. 1 is for the initiator components to be premixed prior to charging to the reactor through the initiator inlet conduit 31 illustrated in FIG. 1. In like manner, if more than one monomer is utilized or if a solvent, gel suppressant or other reactant is desired, it is preferred to mix the two or more monomers and the additional reactants prior to introducing such mixture into the reactor illustrated in FIG. 1 through conduit means 21.

U.S. Pat. No. 4,091,198 discloses continuous polymerization of a conjugated diene with a monovinyl aromatic compound in the production of random copolymers by organolithium initiation. The reactor illustrated in FIG. 1 is particularly applicable to the continuous polymerization process described in U.S. Pat. No. 4,091,198 which is hereby incorporated by reference. The monomer and initiator introduced into the reactor illustrated in FIG. 1 may be those described in U.S. Pat.

No. 4,091,198 and the reaction conditions may be the same as those described in U.S. Pat. No. 4,091,198.

The following examples are presented in further illustration of the invention:

EXAMPLE 1

Polybutadiene was prepared in a continuous polymerization utilizing the reactor configuration illustrated in FIG. 1. The specific components charged to the reactor illustrated in FIG. 1 through the monomer inlet 21 and the initiator inlet 31 are as follows:

|  | Parts by Weight |
|---|---|
| Components Charged Through Monomer Inlet | |
| Butadiene | 100 |
| Cyclohexane | 475 |
| Tetrahydrofuran | 0.04 |
| 1,2-Butadiene | 0.04 |
| Components Charged Through Initiator Inlet | |
| n-Butyllithium | 0.065 |
| Cyclohexane | 156 |

Cyclohexane was utilized as a solvent for the butadiene, n-butyllithium, and for the polymer produced. Tetrahydrofuran was utilized as a promoter while 1,2-butadiene was utilized as a gel suppressant.

The turbine configuration was as illustrated in FIG. 1. The shaft 15 was rotated at 350 rpm. The components charged to the monomer inlet and the initiator inlet were introduced through the outlets 23, 24, 25 and the outlets 33, 34 and 35, respectively. The continuous polymerization process was continued for 151 hours at a reaction temperature of 131° C. At the end of 151 hours the wet polymeric residue in the reactor was determined to occupy ten percent by volume of the reactor. The wet residue was then removed and dried and it was determined that 50 parts per million of dry polymeric residue, based on throughput, had been deposited in the reactor.

EXAMPLE 2

As a comparison, the reactor illustrated in FIG. 1 was modified in such a manner that monomer was introduced into the central portion of the bottom of the reactor and initiator was introduced in the bottom periphery of the reactor. Components charged through the monomer inlet were the same as in Example 1. Components charged to the intiator inlet were the same as in Example 1 except that the amount of n-butyllithium was reduced to 0.055 parts by weight which is not considered to be a significant change with respect to the formation of polymeric residue in the reactor.

The turbine configuration was as illustrated in FIG. 1 and the shaft 15 was again rotated at 350 rpm. The continuous polymerization process was run for 90 hours and the reaction temperature was 126° C. At the end of 90 hours, the wet polymeric residue in the reactor was determined to occupy fifteen percent by volume of the reactor. The amount of dry residue was not directly determined.

Comparing the results of Example 1 with Example 2 indicates that more polymeric residue was formed in the continuous polymerization process of Example 2 than in Example 1 even though the continuous polymerization process of Example 1 was run for a substantially longer period of time thus illustrating that benefits which may be obtained by introducing monomer and initiator into a reactor in accordance with the present invention.

EXAMPLE 3

Polybutadiene was prepared in a continuous polymerization utilizing the reactor configuration illustrated in FIG. 1. The specific components charged to the reactor through the monomer inlet 21 and the initiator inlet 31 are as follows:

|  | Parts by Weight |
|---|---|
| Components Charged Through Monomer Inlet | |
| Butadiene | 100 |
| Cyclohexane | 475 |
| Tetrahydrofuran | 0.04 |
| 1,2-Butadiene | 0.04 |
| Components Charged Through Initiator Inlet | |
| n-Butyllithium | 0.065 |
| Cyclohexane | 156 |

The turbine configuration was as illustrated in FIG. 1. The shaft 15 was again rotated at 350 rpm. The components charged to the monomer inlet and the initiator inlet were introduced through the outlets 23, 24, 25 and the outlets 33, 34 and 35, respectively. The continuous polymerization process was continued for 502 hours at a reaction temperature of 126° C. At the end of 502 hours the wet polymeric residue in the reactor was determined to occupy less than one percent by volume of the reactor. The wet residue was then removed and dried and it was determined that less than one part per million of dry polymeric residue, based on throughput, had been deposited in the reactor.

Reasonable variations and modifications are possible within the scope of the disclosure and the appended claims to the invention.

That which is claimed is:

1. A method for contacting olefinic monomer and initiator in a continuous polymerization process comprising the steps of:
   creating three turbulent zones in a vessel;
   introducing said olefinic monomer into a first part of the periphery of each one of said three turbulent zones;
   introducing said initiator into a second part of the periphery of each one of said three turbulent zones, wherein said first part of said periphery of each one of said three turbulent zones is substantially diametrically opposed to said second part of said periphery of each one of said three turbulent zones respectively.

* * * * *